US005790660A

United States Patent [19]

Vlaeminck

[11] Patent Number: 5,790,660

[45] Date of Patent: Aug. 4, 1998

[54] SHUNTED MODULAR JACK

[75] Inventor: Eric Vlaeminck, Maisons Laffitte, France

[73] Assignee: The Whitaker Corporation, Wilmington, Del.

[21] Appl. No.: 694,050

[22] Filed: Aug. 8, 1996

[30] Foreign Application Priority Data

Aug. 18, 1995 [FR] France .................................. 95 09938

[51] Int. Cl.$^{6}$ ................................ H04M 1/00

[52] U.S. Cl. .......................... 379/442; 379/438; 439/676; 439/188; 439/514

[58] Field of Search .......................... 379/442, 438; 439/676, 188, 514

[56] References Cited

U.S. PATENT DOCUMENTS 5,312,273 5/1994 Andre et al. ............................ 439/676

*Primary Examiner*—Dwayne Bost
*Assistant Examiner*—Keith Ferguson
*Attorney, Agent, or Firm*—Bradley N. Ditty

[57] ABSTRACT

A shunted modular jack is provided with a shunting module mounted against a rear face of the modular jack. The shunting module comprises a housing and shunting contacts having pairs of shunting contact portions. The shunting contacts are mounted to the housing at different levels to enable a large plurality of shunting combinations, and easy and cost-effective alteration of shunting configurations without alteration of the modular jack housing.

10 Claims, 6 Drawing Sheets

SHUNTED MODULAR JACK

BACKGROUND OF THE INVENTION

1. Field of the Invention

This invention relates to a connection assembly comprising a modular jack and a shunting module for short circuiting certain terminals of the modular jack.

2. Description of the Prior Art

Modular jacks are typically used for interconnection of telephone or datacommunication systems, and have a standardized interface. In certain applications, there is a need to short circuit pairs of terminals of the modular jack when uncoupled to a complementary modular plug. Different applications sometimes require short circuiting of different pairs of the modular jack terminals. European Patent 33,794 discloses a modular jack with U-shaped shorting clips that are positioned in the back wall of the modular jack housing for interconnecting adjacent pairs of terminals. The individual clips are mounted directly to the modular jack housing, thereby requiring a different modular jack assembly for each configuration of shunted terminals. It would be desirable to provide a more cost-effective solution that enables provision of modular jacks with different shunting configurations. Furthermore, it would be desirable to enable shunting between any pair of the terminals of a modular jack, in particular modular jacks with large numbers of terminals (e.g. eight terminals) in a simple and cost-effective manner.

SUMMARY OF THE INVENTION

It is therefore an object of this invention to provide a modular jack with shunting means for short circuiting terminals of the modular jack, the shunting means enabling different combinations of terminals to be short circuited in a cost-effective and reliable manner.

It is a further object of this invention to provide a modular jack with shunting means enabling a large combination of shunting configurations.

Objects of this invention have been achieved by providing a modular jack connector assembly with a standardized interface for coupling to a modular plug, the modular jack assembly having one or more shunting contacts interconnecting electrical terminals of the assembly, wherein the one or more shunting contacts are mounted in a separate insulative shunt housing that is mountable to a rear face of a housing of the modular jack assembly. In an advantageous embodiment, the shunt housing has different levels for receiving mounting portions of the shunting contacts in different planes to enable interconnection of a large plurality of different pairs of modular jack contacts, some which may be adjacent each other, and some remote from each other, in a large number of combinations. In one embodiment, the shunt housing may be provided with a plurality of shunting contact receiving cavities arranged in a matrix for stitching of U-shaped shunting contacts therethrough. In another embodiment, U-shaped shunting contacts are inmoulded to the insulative housing. The shunting contacts could be manufactured from wire. The shunting module could be provided with studs (or conversely holes) pluggable into complementary holes (studs) extending from the rear face of the modular jack housing for positioning and assembly of the shunting module to the modular jack housing.

DETAILED DESCRIPTION OF THE PREFERRED EMBODIMENT

Figure 1:
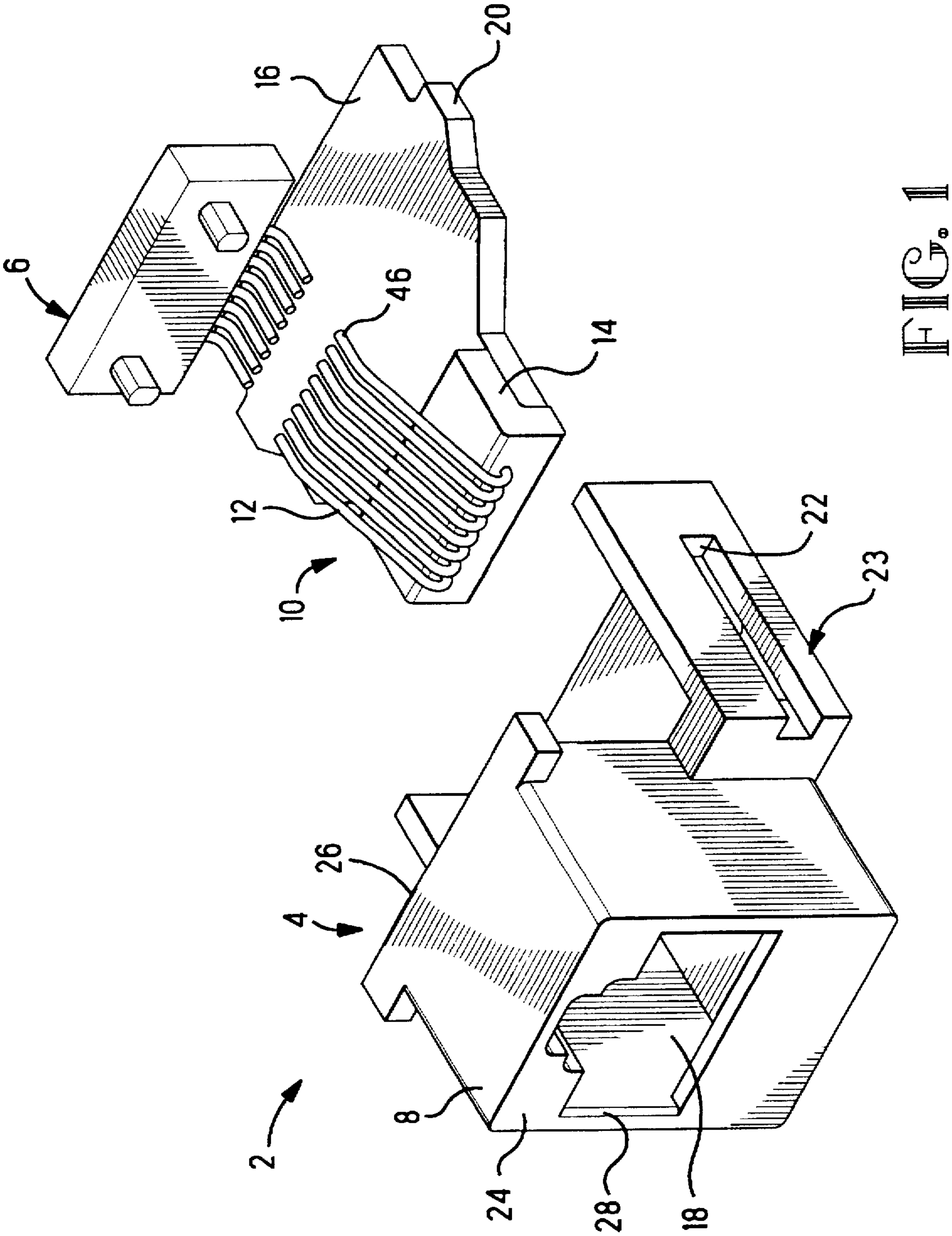
FIG. 1 is an isometric exploded view of a first embodiment according to this invention.
Figure 2:
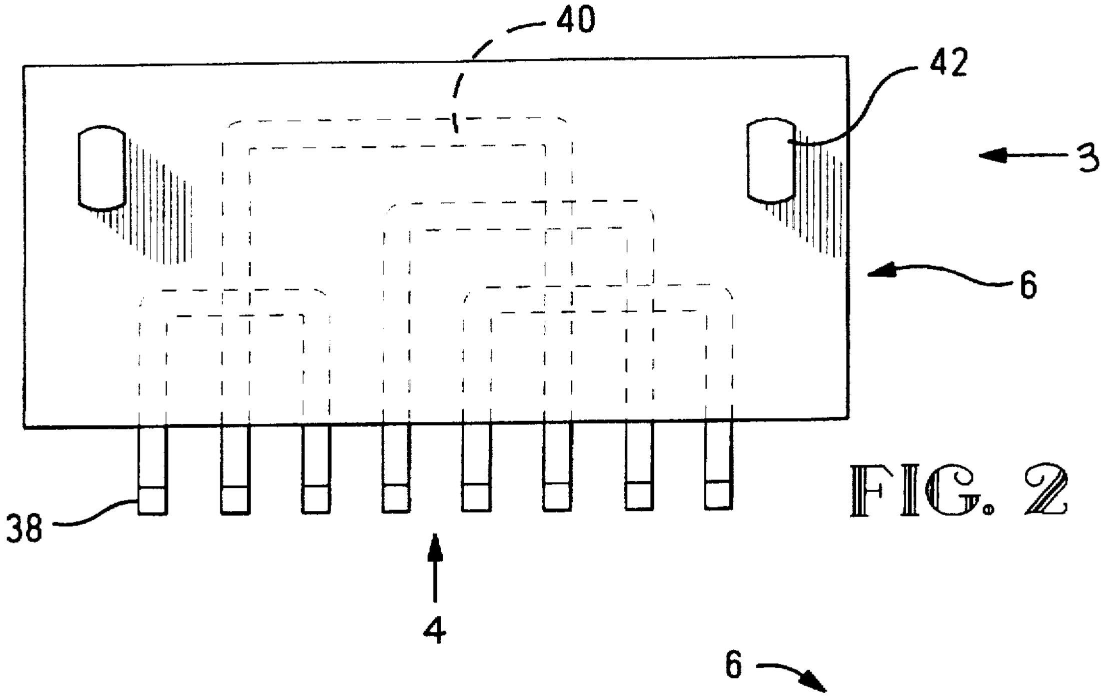
FIG. 2 is a front view of a shunting module.
Figure 3:
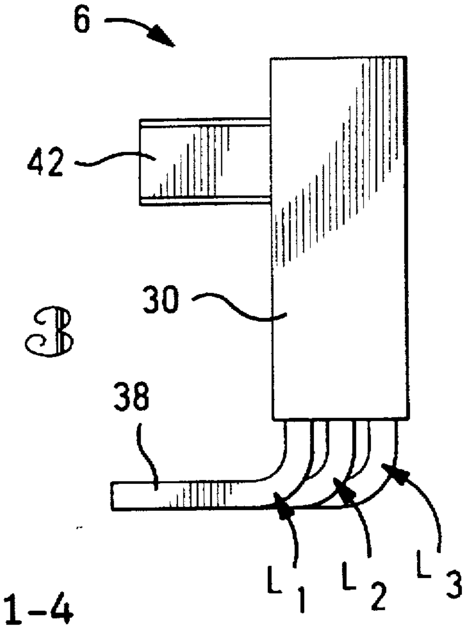
FIG. 3 is a view in the direction of arrow 3 of FIG. 2.
Figure 4:
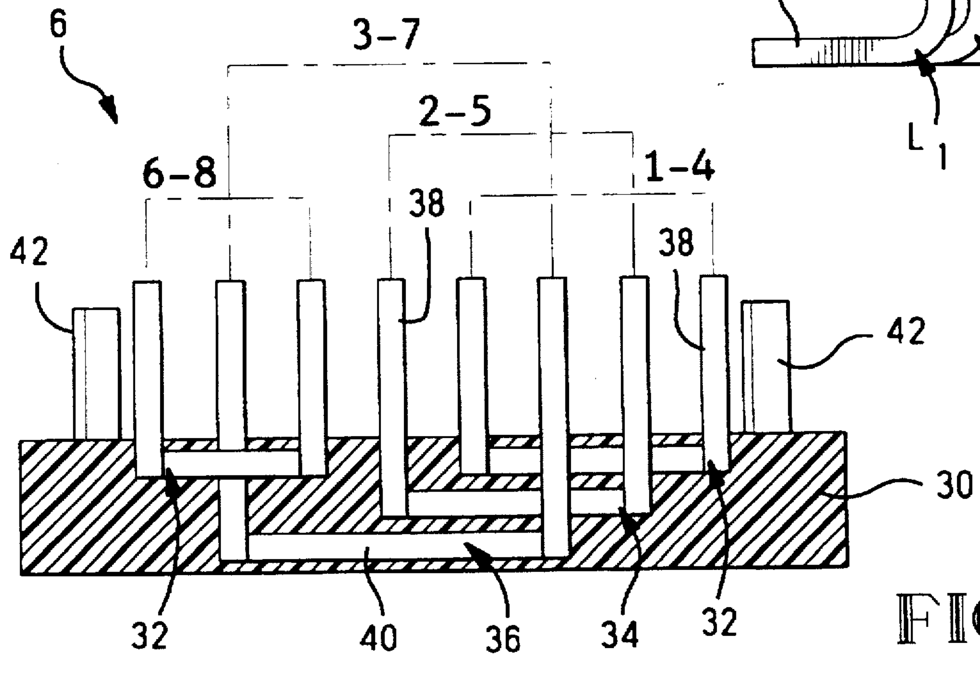
FIG. 4 is a view in the direction of arrow 4 of FIG. 2 with some of the shunt housing cut away.
Figure 5:
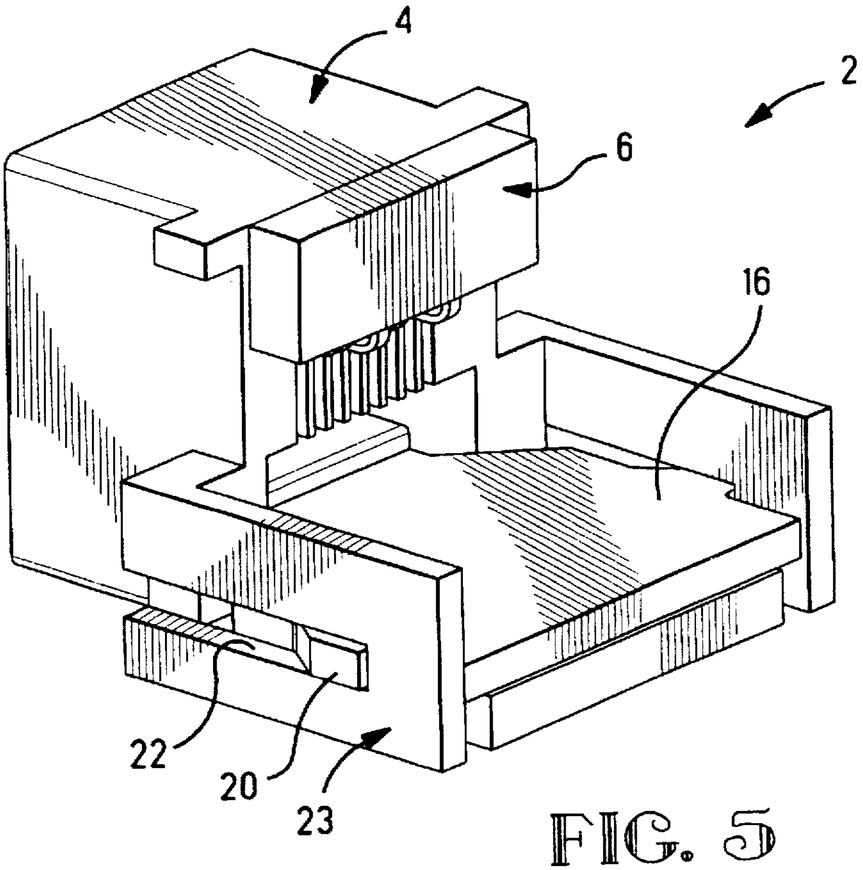
FIG. 5 is an isometric view towards the rear face of the connector assembly of FIG. 1.
Figure 6:
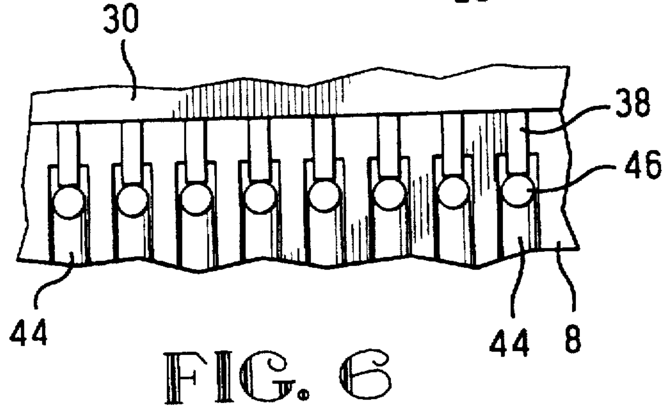
FIG. 6 is a partial detailed view of engagement of the shunt contacts with the terminals of the assembly of FIG. 1.
Figure 7:
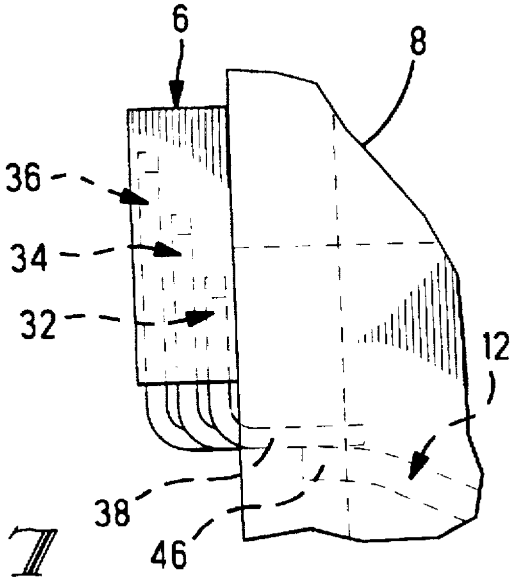
FIG. 7 is a detailed side view showing connection of the shunt contacts to the terminals.

Referring first to FIGS. 1–7, a modular jack connection assembly 2 comprises a modular jack 4 and a shunting module 6. The modular jack 4 comprises an insulative housing 8 and a terminal module 10 comprising a plurality of terminals 12 assembled together in a juxtaposed manner by an overmoulded insulating base 14. The terminal module 10 is mounted on a board 16, for example a printed circuit board (PCB), or flexible flat cable, for electrical connection thereto. The board and terminal module 10 are securely mountable within a cavity 18 of the housing 8, by provision of latching shoulders 20 on the board 16 that engage in slots 22 of resilient latching arms 23 flanking either side of the insulating housing 8 and extending rearwardly therefrom. The modular jack housing 8 extends from a front, complementary connector receiving face 24, to a rear face 26 from where the terminal module is received. The front face 24 has a cutout 28 for receiving a complementary modular plug therethrough. The cutout 28 and terminal module 10 form a standardized interface for connection to a standardized modular plug.

The shunting module 6 comprises an insulative housing 30 and a plurality of shunt contacts 32,34,36 that each have a pair of spaced-apart parallel contact portions 38 extending from a base portion 40. The shunt contacts 32,34,36 are formed from wire for cost-effective manufacturing thereof. Their base portions 40 are overmoulded by the housing 30 for mounting of a plurality of shunt contacts in the housing to form a unitary shunting module 6. The base portions 40 of the respective shunt contacts 32,34,36 are at different levels L1,L2,L3 (see FIG. 3) such that positions 6–8 adjacent each other (see FIG. 4) can be shunted, or positions 2–5 and 1–4 remote from each other can be shunted in many different combinations with a plurality of shunt contacts 32,24,36.

The shunting module 6 has mounting portions 42 extending from the housing 30 and cooperable with complementary mounting portions in the housing 8 of the modular jack 4. The mounting portions may either be interference fit, resilient latches, or bondable. The modular jack 4 is similar to an existing modular jack except for provision of mounting portions for assembly of the shunting module 6. In order to provide modular jack assemblies 2 with different shunting configurations, only different shunting modules 6 need to be provided, where for example a plurality of different shunting modules 6 can be manufactured and then selected for assembly to the standard modular jack 4 depending on the shunting requirements. Assembly of the unitary module 6 to the modular jack 4 is therefore cost-effective because it enables a large plurality of different shunting configurations to be provided for a standardized modular jack without requiring changes or complex design of the modular jack 4. Changes to shunting requirements merely requires provision of a new shunting module rather than design modification to the modular jack.

The contact portions 38 of the shunting contacts are received within slots 44 in the modular jack housing that forms a comb-like structure for receiving free ends 46 (see FIGS. 1 and 6) of the modular jack terminals 12 therein. The slots 44 provide guidance to the terminals 12. The contact portions 38 of the shunting contacts 32,34,36 are received within their respective slots 44 of the modular jack housing whereby the free ends 46 of the terminals 12 bias thereagainst when the modular jack assembly 2 is in the uncoupled state. When coupled to a modular plug, the terminals 12 are resiliently biased such that their free ends 46 disengage from the shunting contact portions 38, thereby disconnecting the shunting function.

Figure 8:
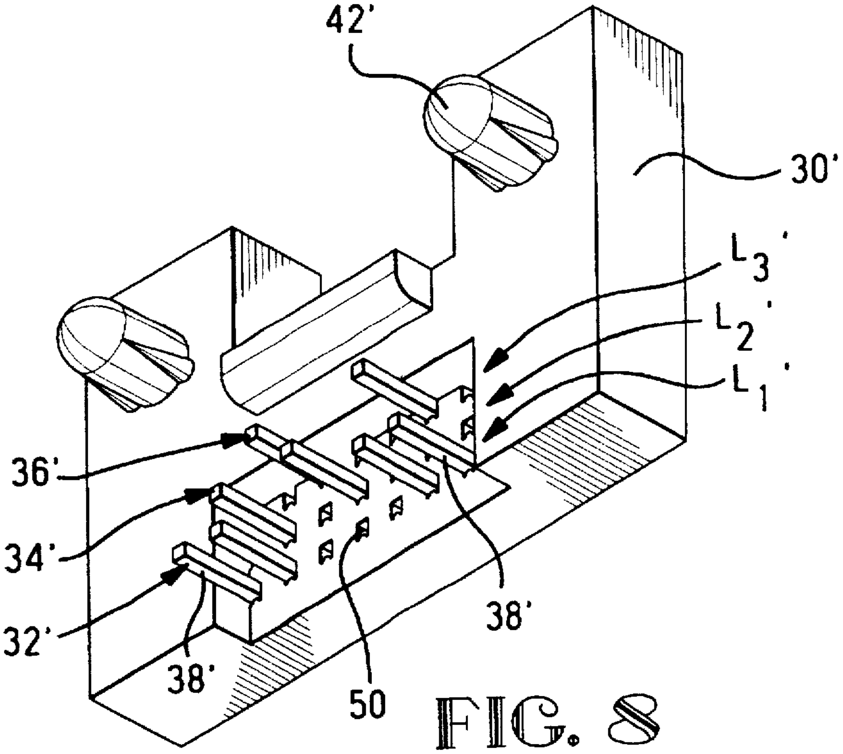
FIG. 8 is an isometric view of another embodiment of a shunting module according to this invention.
Figure 9:
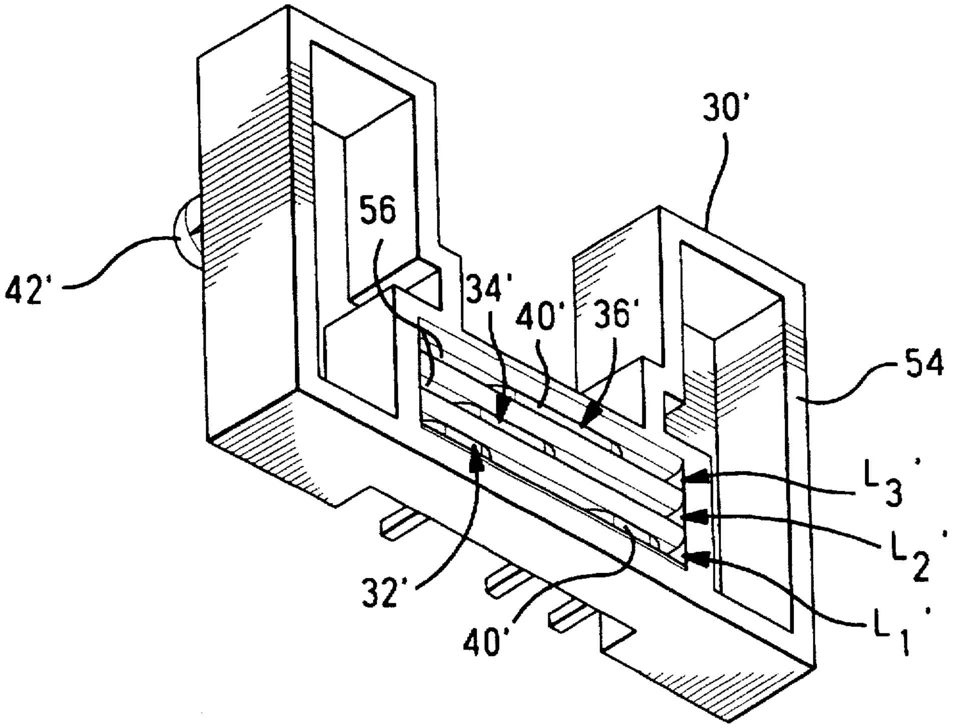
FIG. 9 is an isometric view of a rear face of the shunting module of FIG. 8.
Figure 10:
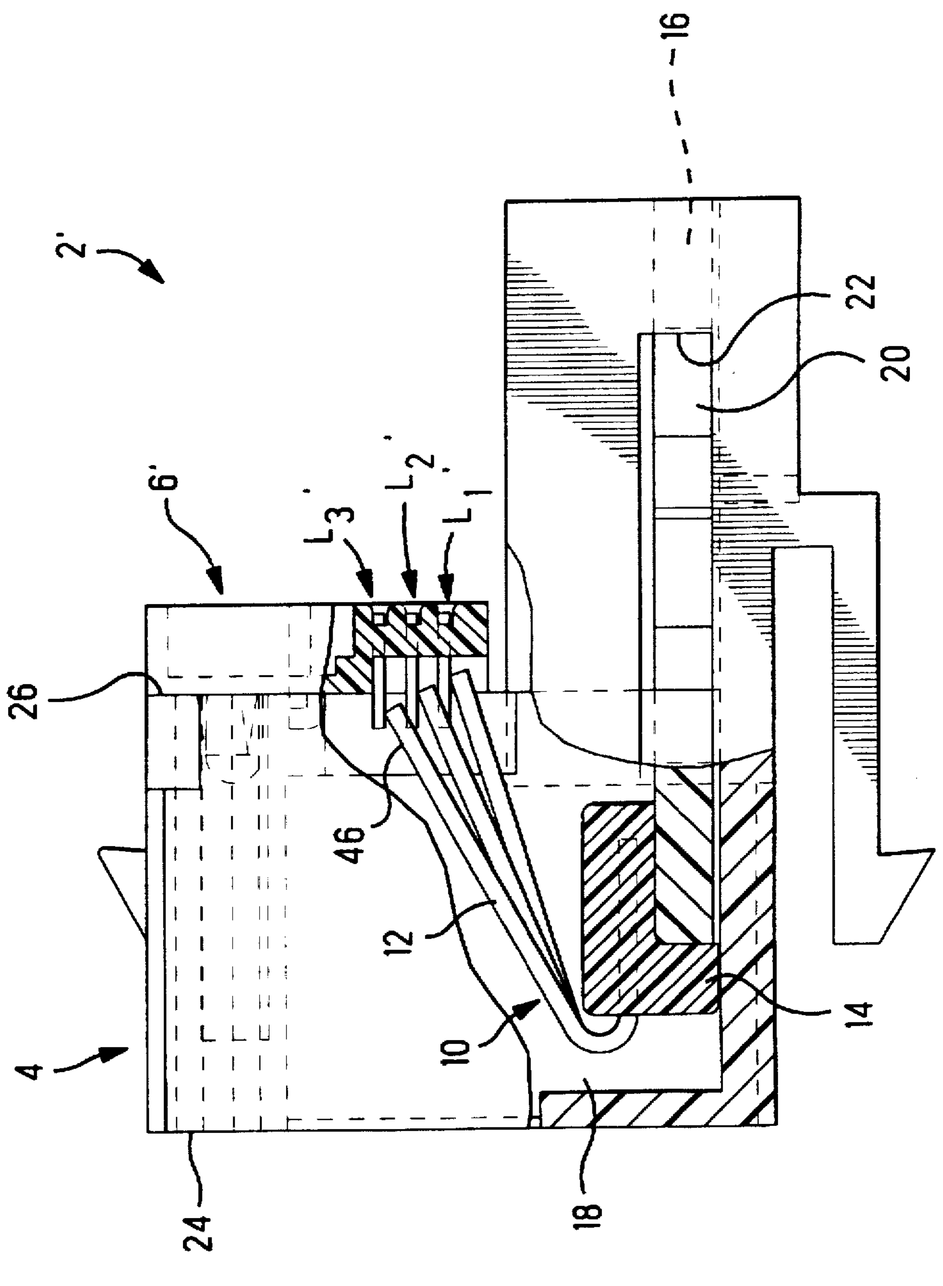
FIG. 10 is a partial cross-sectional view of a modular jack assembly with the shunting module of FIG. 8.
Figure 11:
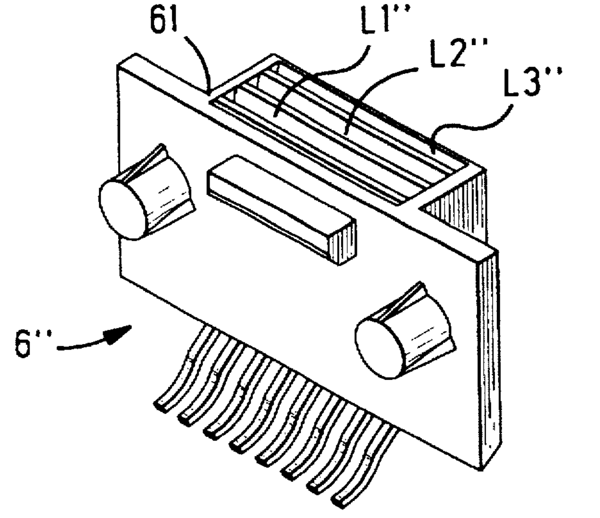
FIG. 11 is an isometric view of a third embodiment of a shunting module according to this invention.

FIGS. 8–10 show another embodiment of this invention, where the modular jack assembly 2' comprises a modular jack 4 substantially identical to the modular jack described hereabove, and a second embodiment of a shunting module 6'. The shunting module 6' can be mounted to the modular jack housing 8 against a rear face 26 in a similar manner to the first embodiment. The main difference between the designs of the two shunting modules, is that the second shunting module 6' comprises a plurality of cavities 50 disposed in a juxtaposed manner in different rows that form levels L1',L2' and L3' to form a matrix of cavities 50. In each of the levels L1'–L3', U-shaped shunt contacts 32',34' and 36' respectively can be mounted at the different levels L1',L2',L3'. The shunt contacts 32',34',36' comprise a base portion 40' interconnecting a pair of parallel contact portions 38' extending substantially perpendicularly from the base portion 40'. From a rear face 54 of the housing 30' of the shunting module 6, extend longitudinal recesses 56 along the rows of cavities 50 that form the levels L1',L2' and L3' for receiving the base portions 40' of the shunt contacts 32',34' and 36' respectively. The shunt contacts can be mounted to the housing 30' by an interference fit between the cavities 50 and the contact portions 38'. The latter arrangement allows assembly of the shunt contacts to the housing to be effected by "stitching" of the contacts thereto for cost-effective manufacturing. Only one moulding die is required for production of the insulative housing 30', whereby different shunting configurations can be provided by stitching different shunt contacts in different positions. Cost-effective production of different shunting modules is thus enabled. The shunt contacts 32',34',36' can be manufactured from wire into a very simple U-shape being very cost-effective to manufacture. Free ends 46 of the terminal 12 thus abut the contact portions 38' of the shunt contacts 32',34',36' at their respective levels L1',L2',L3' as shown in FIG. 10. When coupled to a complementary modular plug, the terminals 12 are resiliently biased away from the shunting contact portions in a similar manner to the previous embodiment.

Figure 12:
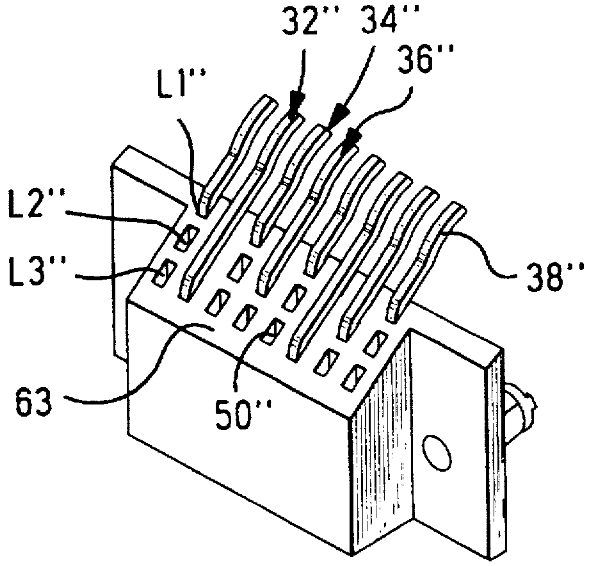
FIG. 12 is an isometric view of the module of FIG. 11 showing a bottom side.
Figure 13:
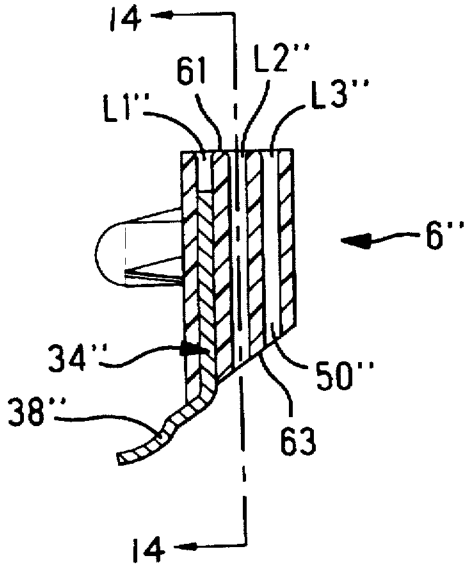
FIG. 13 is a cross-sectional view of the module of FIG. 11.
Figure 14:
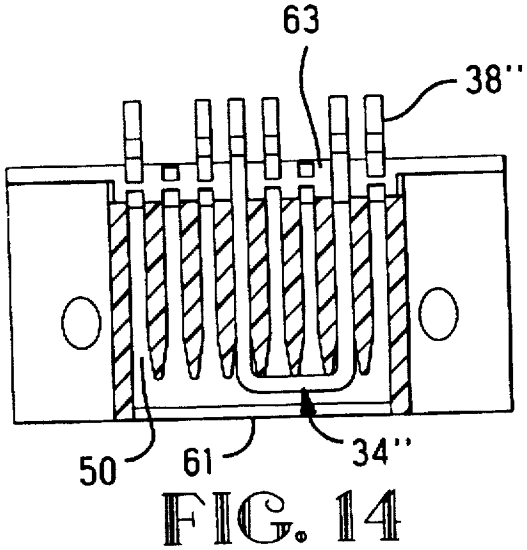
FIG. 14 is a cross-sectional view through lines 14—14 of Fig. 13.

Referring to FIGS. 11–14, a third embodiment of a shunting module 6" is shown. Features similar to those already described are provided with the same numbers raised to a double prime. Only relevant differences will be described, the other features being understood from the description of the previous embodiments. The shunting module 6" is mounted in a similar manner against a rear face 26 of the modular jack housing 8 described with the previous embodiments. The main difference between the third shunting module 6" and the second shunting module 6', is that a plurality of cavities 50" extend parallel to the rear face 26 of the modular jack housing 8, rather than transversely as is the case for the second embodiment 6'. The principle is the same, in that different rows form levels L1", L2" and L3" to form a matrix of cavities 50". Shunt contacts 32", 34", 36" can be stitched into the cavities from a top face 61 of the module, to project beyond a lower face 63 of the module. The contact portions 38" of the contacts are subsequently bent at an angle as shown in FIG. 12. Alternatively, the contacts could also be overmoulded by the shunt module housing, although stitching provides a very cost-effective manufacturing method. In the embodiment of FIGS. 11–14, the shunting contacts have contact portions 38" that are aligned with each other at the same height similar to the first embodiment.

Advantageously therefore, a standardized modular jack assembly is provided with a shunting module enabling a large combination of shunting configurations, the assembly being cost-effective to manufacture, in particularly enabling assemblies with different shunting configurations to be provided in a cost-effective manner.

I claim:

1. An electrical modular jack assembly for coupling to a standardized modular plug, the assembly comprising a modular jack having an insulative housing and a terminal module with a plurality of juxtaposed resilient terminals mounted in a cavity of the housing adapted to receive said modular plug therein, further comprising a shunting module engaging and interconnecting free ends of the terminals when the assembly is in the uncoupled state, wherein the shunting module comprises an insulative housing and one or more shunt contacts having a base portion and a pair of contact portions extending from either end of the base portion mounted securely thereto where it is possible to mount the shunt contacts in a number of different positions to provide shunting modules with different shunting configurations, the shunting module being a separate component from the modular jack but securely mountable thereto as a single unit and wherein a plurality of said shunt contacts are mounted in the insulative housing of the shunting module at different levels.

2. The assembly of claim 1 wherein the shunt contacts are made of wire.

3. The assembly of claim 1 wherein the shunt contacts are mounted to the shunting module housing by overmoulding of the housing over the shunting contacts.

4. The assembly of claim 1 wherein the shunt contacts are stitched to cavities of the shunting module housing.

5. The assembly of claim 1 wherein the shunting module housing comprises a plurality of shunt contact receiving cavities arranged in a plurality of rows to form a matrix of holes, for receiving the shunt contacts at different levels and for different pairs of modular jack terminals.

6. An electrical modular jack assembly for coupling to a standardized modular plug, the assembly comprising a modular jack having an insulative housing and a terminal module with a plurality of juxtaposed resilient terminals mounted in a cavity of the housing adapted to receive said modular plug therein, further comprising a shunting module interconnecting free ends of the terminals when the assembly is in the uncoupled state, wherein the shunting module comprises an insulative housing and one or more shunt contacts mounted securely thereto where it is possible to mount the shunt contacts in a number of different positions to provide shunting modules with different shunting configurations, the shunting module being a separate component from the modular jack but securely mountable thereto as a single unit and wherein a plurality of said shunt contacts are mounted in the insulative housing of the shunting module at different levels each shunt contact comprising a base portion and a pair of contact portions extending from either end of the base portion and a pair of contact portions extending from either end of the base portion.

7. The assembly of claim 6 wherein the shunt contacts are made of wire.

8. The assembly of claim 6 wherein the shunt contacts are mounted to the shunting module housing by overmoulding of the housing over the shunting contacts.

9. The assembly of claim 6 wherein the shunt contacts are stitched to cavities of the shunting module housing.

10. The assembly of claim 6 wherein the shunting module housing comprises a plurality of shunt contact receiving cavities arranged in a plurality of rows to form a matrix of holes, for receiving the shunt contacts at different levels and for different pairs of modular jack terminals.

* * * * *